United States Patent Office.

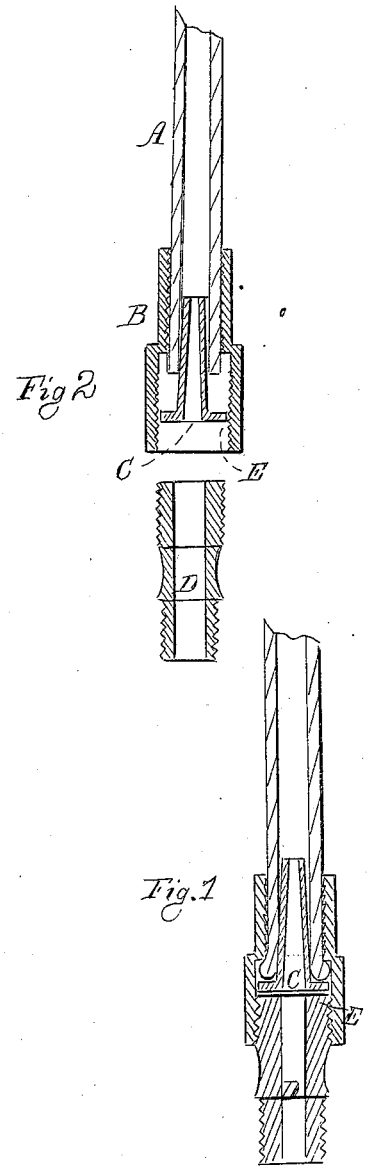

JOHN H. GEORGE, OF NEWARK, NEW JERSEY.

Letters Patent No. 92,954, dated July 27, 1869.

IMPROVEMENT IN HOSE-COUPLING.

The Schedule referred to in these Letters Patent and making part of the same.

*To all whom it may concern:*

Be it known that I, JOHN H. GEORGE, of Newark, in the county of Essex, and State of New Jersey, have invented an Improved Hose-Coupling for portable drop-lights; and I do hereby declare that the following is a full and exact description of the same, reference being had to the accompanying drawings, and to the letters of reference marked thereon.

My invention consists in the mode employed in securing the rubber pipe in the coupling.

In the ordinary coupling, the rubber is screwed into the end of it, and is held in place by the thread of the screw only. This mode of attaching the hose or pipe is very defective, as the tube is very liable to come out in use, or get loose, so that the gas may escape.

To provide against these defects is the object of this invention.

I construct a small metal tube, C, with one end tapering, and a flange, E, across the other end, filling the space in the female section of the coupling B. This, when in its position, the end passing into the rubber tube A, is pressed down by the male section of the coupling D being screwed down into the coupling B. This crowds the rubber closely into the thread of the screw, and over the shoulder above the same, holding it positive, and allowing no chance for it to become loose, or be detached.

This becomes at once a simple and positive hose-coupling, and not liable to get out of repair.

The mode of constructing the hose-coupling with male and female sections, is also believed to be new. Therefore,

What I claim as my invention, and desire to secure by Letters Patent, is—

1. The hose-coupling, constructed with the male and female sections B, substantially as and for the purpose specified.

2. The tube C, or its equivalent, in combination with the coupling B D, substantially as and for the purpose specified.

J. H. GEORGE.

Witnesses:—
HORACE HARRIS,
S. W. CLARK.